(12) United States Patent
Noda et al.

(10) Patent No.: US 6,517,785 B2
(45) Date of Patent: *Feb. 11, 2003

(54) SYSTEM FOR EXHAUST GAS PURIFICATION

(75) Inventors: Naomi Noda, Ichinomiya (JP);
Yukinari Shibagaki, Konan (JP);
Akira Takahashi, Nagoya (JP);
Hiroshige Mizuno, Tajimi (JP)

(73) Assignee: NGK Insulators, Ltd. (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/120,888

(22) Filed: Jul. 23, 1998

(65) Prior Publication Data

US 2001/0001648 A1 May 24, 2001

(30) Foreign Application Priority Data

Jul. 28, 1997 (JP) .............................................. 9-201519

(51) Int. Cl.$^7$ .......................... B01D 53/94; B01D 53/72; F01N 3/28

(52) U.S. Cl. ........................ 422/180; 422/171; 422/177

(58) Field of Search ................................ 422/171, 177, 422/180; 60/297, 299

(56) References Cited

U.S. PATENT DOCUMENTS

| 4,177,307 A | 12/1979 | Torii et al. ................... 428/116 |
| 5,455,097 A | 10/1995 | Machida et al. ............ 428/116 |
| 5,538,697 A | * 7/1996 | Abe et al. .................... 422/171 |
| 5,619,853 A | 4/1997 | Brown ......................... 60/288 |

FOREIGN PATENT DOCUMENTS

| EP | 0 661 098 A2 | 5/1995 |
| EP | 0 749 774 A2 | 12/1996 |

* cited by examiner

*Primary Examiner*—Hien Tran
(74) *Attorney, Agent, or Firm*—Parkhurst & Wendel, L.L.P.

(57) ABSTRACT

A system for exhaust gas purification disposed in the exhaust pipe of an internal combustion engine, includes (1) an adsorbent comprising a monolithic carrier and (2) an adsorbent component having a hydrocarbon adsorptivity, loaded on the carrier, and a catalyst comprising a monolithic carrier and a catalyst component loaded on the carrier, having a purifiability for the harmful substances present in the exhaust gas emitted from the engine. The catalyst is provided downstream of the adsorbent in the flow direction of the exhaust and it can remove the hydrocarbons generated during engine cold gas. The adsorbent has a sectional shape satisfying the following relation:

$$1.2 \leq (\text{major axis})/(\text{minor axis}) \leq 6.5$$

This system enables the desorption of hydrocarbons from the adsorbent in a longer time and can remove the hydrocarbon generated during engine cold start at a higher purification ratio.

30 Claims, 5 Drawing Sheets

SYSTEM FOR EXHAUST GAS PURIFICATION

BACKGROUND OF THE INVENTION (1) Field of the Invention

The present invention relates to a system for exhaust gas purification, capable of effectively purifying the harmful substances present in the exhaust gas emitted from an internal combustion engine, particularly the hydrocarbons discharged from the engine in a large amount during the cold start.

(2) Description of Related Art

Active researches and developments have heretofore been made on systems for exhaust gas purification, used for purifying the harmful substances present in exhaust gas from automobile engine, such as nitrogen oxides ($NO_x$), carbon monoxide (CO), hydrocarbons (HC) and the like. In recent years, as the regulation on exhaust gas has become stricter, the purification of HC during engine start (cold start) has become an important technical task.

The reason is as follows. During the cold start of engine when the temperature of exhaust gas from engine is low, the catalyst disposed in exhaust pipe of engine does not reach its light-off temperature and has a low purification ability. Moreover, during this period, as compared with the period of continuous operation of engine, a large amount of HC is discharged from the engine. As a result, the HC discharged during the cold start occupies a large proportion of the total harmful substances discharged from the engine and needs to be removed.

As one means for achieving the above-mentioned technical task (the purification of HC during engine start), there was proposed a system for exhaust gas purification disposed in the exhaust pipe of an internal combustion engine, comprising (1) an adsorbent comprising a monolithic carrier and an adsorbent component (e.g. zeolite) having an adsorptivity for HC, loaded on the carrier and (2) a catalyst provided downstream of the adsorbent (1). This adsorbent is intended to adsorb the unburnt HC discharged from the engine in a large amount during the cold start, temporarily from the start of catalyst heating to the start of catalyst light-off.

As the adsorbent used in such a system for exhaust gas purification, an adsorbent having a circular sectional shape is known. Also, a system using an adsorbent having a elliptical sectional shape is disclosed in U.S. Pat. No. 5,619,853.

The HC adsorbed by an adsorbent begins to be desorbed as the temperature of the adsorbent increases owing to the heat of exhaust gas, etc. In an adsorbent having a circular sectional shape, such as mentioned above, since the distance from the sectional center to the sectional periphery is constant, the amount of the exhaust gas flowing through the peripheral area is about the same at any point of peripheral area and the temperature elevation rate is about the same as well at any point of peripheral area. As a result, in an adsorbent having a circular sectional shape, the whole peripheral area reaches the HC desorption start temperature simultaneously and the HC adsorbed by the adsorbent is desorbed in a large amount in a relatively short time.

Also in the system using an adsorbent having an elliptical sectional shape, described in U.S. Pat. No. 5,619,853, the amount of the exhaust gas flowing through the adsorbent is made the same at any sectional point, by the use of a diverter provided upstream of the adsorbent; therefore, the whole section shows about the same temperature elevation and reaches the HC desorption start temperature simultaneously; consequently, the HC adsorbed by the adsorbent is desorbed in a large amount in a relatively short time.

Such desorption of HC from adsorbent in large amount in short time has caused, in some cases, a problem that the HC amount in exhaust gas exceeded the HC amount which can be purified by a catalyst in the same short length of time. As a result, there has occurred, in some cases, a problem that the purification ratio for the HC generated during cold start is low.

SUMMARY OF THE INVENTION

The present invention has been completed in view of the above-mentioned problems of the prior art. The object of the present invention is to provide a system for exhaust gas purification, in which the adsorbent can desorb the adsorbed HC in a longer time and the HC generated during cold start can be removed at a higher purification ratio.

According to the present invention there is provided a system for exhaust gas purification disposed in the exhaust pipe of an internal combustion engine, which comprises:

an adsorbent comprising a monolithic carrier and an adsorbent component having a hydrocarbon adsorptivity, loaded on the carrier, and a catalyst comprising a monolithic carrier and a catalyst component loaded on the carrier, having a purifiability for the harmful substances present in the exhaust gas emitted from the engine, the catalyst being provided downstream of the adsorbent in the flow direction of the exhaust gas, in which system the adsorbent has a sectional shape satisfying the following relation:

$$1.2 \leq (\text{major axis})/(\text{minor axis}) \leq 6.5$$

DETAILED DESCRIPTION OF THE PREFERRED EMBODIMENT

The system for exhaust gas purification according to the present invention is disposed in the exhaust gas line of an internal combustion engine and comprises an adsorbent for adsorbing the HC emitted from the engine and a catalyst provided downstream of the adsorbent, for purifying the harmful substances present in the exhaust gas. In the system, the adsorbent has such a structural feature that the sectional shape satisfies the following relation:

$$1.2 \leq \text{(major axis)/(minor axis)} \leq 6.5$$

Figure 9:
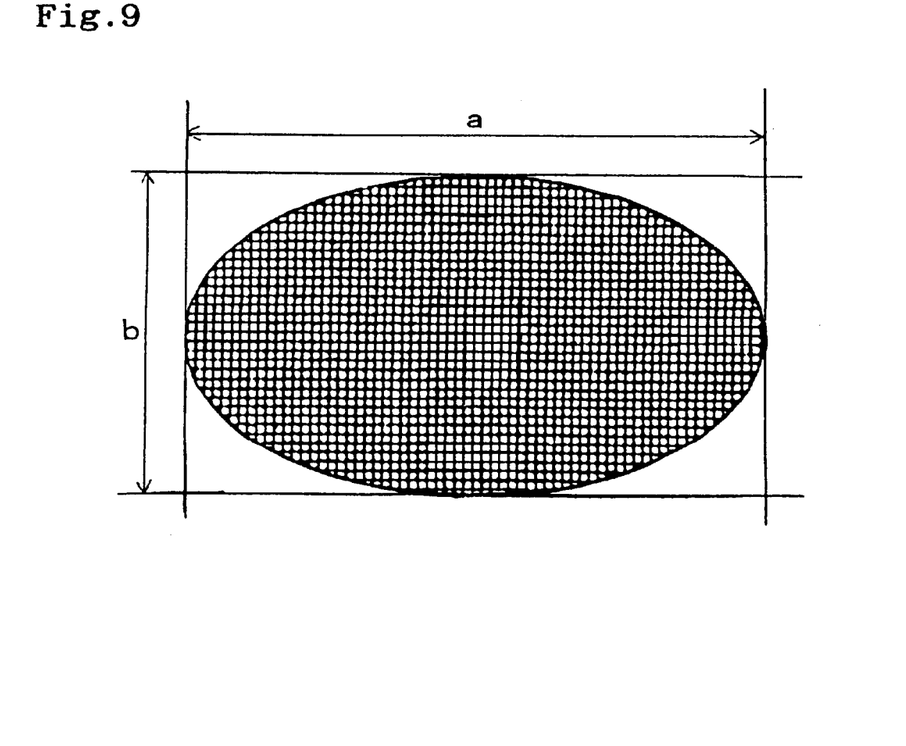
FIG. 9 is a drawing showing the sectional major and minor axes of an adsorbent having an elliptical sectional shape.
Figure 10:
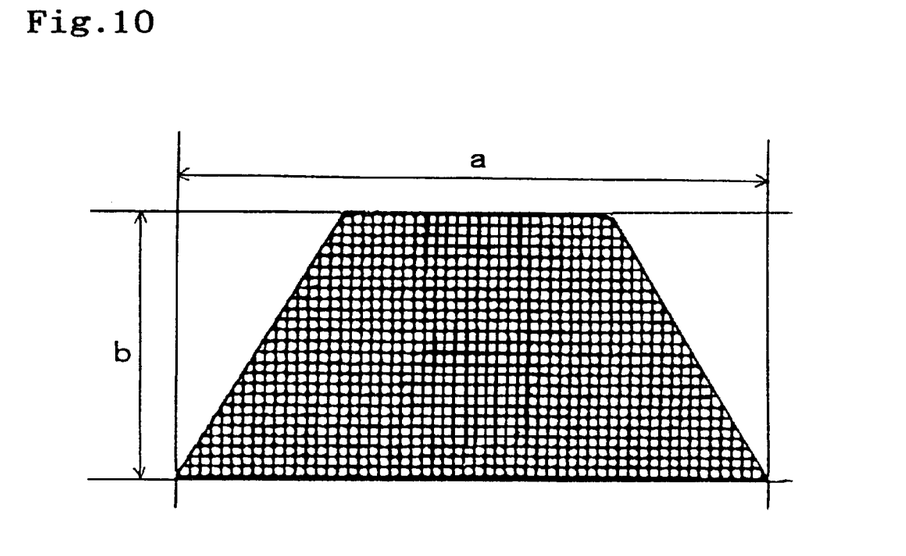
FIG. 10 is a drawing showing the sectional major and minor axes of an adsorbent having a trapezoid sectional shape.

In the present invention, the sectional "major axis" of the adsorbent refers to the maximum distance between any two parallel lines contacting with the section of the adsorbent formed when the adsorbent is cut normal to the axial direction of each passage (cell) of the monolithic carrier constituting the adsorbent; and the sectional "minor axis" of the adsorbent refers to the minimum distance between any two parallel lines contacting with said section of the adsorbent. For example, in FIG. 9, a sectional major axis "a" and a sectional minor axis "b" are shown when the section is elliptical; and in FIG. 10, a sectional major axis "a" and a sectional minor axis "b" are shown when the section is trapezoid.

In an adsorbent having a sectional shape satisfying the above-mentioned relation of (major axis)/(minor axis), the distance from the flow center of exhaust gas passing through the adsorbent, to the sectional periphery of adsorbent is not constant and varies depending upon the position of sectional periphery. Therefore, at the sectional peripheral area of the adsorbent, the flow amount of exhaust gas differs and the temperature elevation rate also differs, depending upon the position of said peripheral area. That is, at the sectional peripheral area of major axis, unlike at the sectional peripheral area of minor axis, the flow amount of exhaust gas is small and the temperature elevation is slow. Consequently, the timing in which the HC desorption start temperature is reached, differs depending upon the position of the adsorbent, and the time taken from HC desorption start to HC desorption completion becomes longer.

Figure 11:
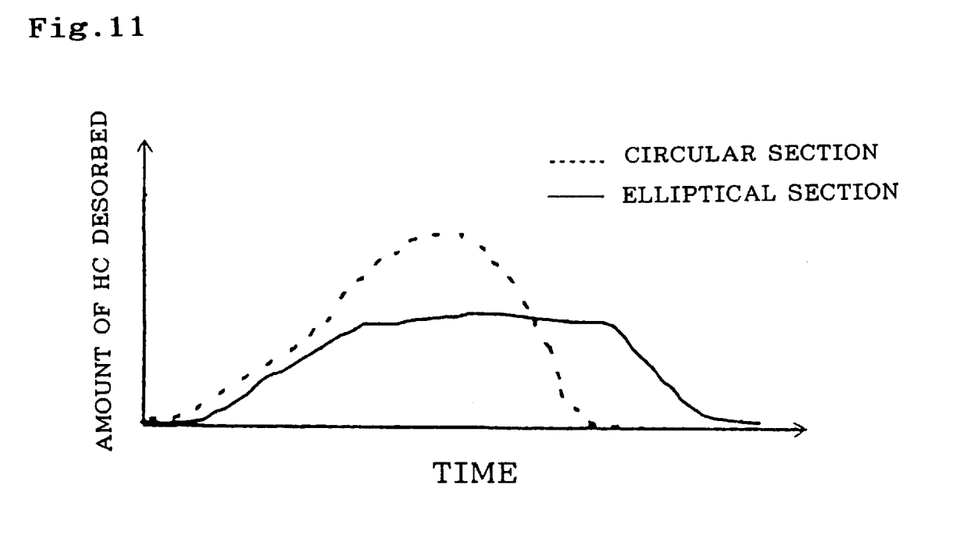
FIG. 11 is a graph showing a relationship between (1) the time of HC desorption from adsorbent from the start to the completion and (2) the amount of HC desorbed.

FIG. 11 shows relations of (1) time from HC desorption start to HC desorption completion and (2) amount of HC desorbed, measured on a conventional adsorbent having a circular section and an adsorbent used in the present system, having an elliptical section of given (major axis)/(minor axis). It is appreciated from FIG. 11 that in the adsorbent used in the present system, as compared with the case of using a conventional adsorbent, HC desorption takes place in a longer time.

The exhaust gas purification system of the present invention uses an adsorbent having such a sectional shape that the temperature elevation rate of the adsorbent differs depending upon the position of its section and consequently the desorption of adsorbed HC from the adsorbent is made in a longer time. As a result, the HC desorbed from the adsorbent can be removed by the catalyst also provided in the system, at a higher purification ratio. There is no particular restriction as to the sectional shape of the adsorbent as long as the (major axis)/(minor axis) is in the above-mentioned range. Therefore, the adsorbent can have improved mountability on automobile by taking, for example, a sectional shape fitting the layout beneath the body floor.

When the adsorbent section has a relation of (major axis)/(minor axis)<1.2, the various positions of the adsorbent section have no sufficient difference in temperature elevation rate; as a result, the HC adsorbed by the adsorbent is desorbed in a short time. Meanwhile, when the adsorbent section has a relation of (major axis)/(minor axis)>6.5, the flow amount of exhaust gas in the sectional peripheral area of major axis is too small and the amount of HC adsorbed is extremely small in said peripheral area.

The adsorbent used in the present system comprises a monolithic carrier and an adsorbent component having a HC adsorptivity, loaded on the monolithic carrier. The monolithic carrier refers to a structure having passages (cells) surrounded by substantially uniform partition walls, which is generally called a honeycomb structure. As the material for the monolithic carrier, there are suitably used ceramic materials made of cordierite, mullite or the like; foil-shaped metallic materials made of a heat-resistant stainless steel (e.g. Fe—Cr—Al alloy); and metallic materials molded into a honeycomb structure by powder metallurgy.

The adsorbent component used in the adsorbent includes zeolite, active carbon, etc. The adsorbent component must have a heat resistance of at least 500° C. for use in an exhaust gas system, and is preferably composed mainly of zeolite. Zeolite may be any of a natural product or a synthetic product, and has no particular restriction as to the kind. However, a zeolite having a Si/Al molar ratio of 40 or more is preferably used in view of the heat resistance, durability and hydrophobicity. Specific examples of such a zeolite are preferably ZSM-5, USY, β-zeolite, silicalite and a metallosilicate.

Zeolite can be used in one kind or in a combination of two or more kinds. For example, ZSM-5 having relatively small pores of about 0.55 nm in diameter is advantageous for adsorption of small molecules (e.g. propene) but disadvantageous for adsorption of large molecules (e.g. toluene and xylene). Meanwhile, USY having relatively large pores of about 0.74 nm in diameter is disadvantageous for adsorption of small molecules (e.g. propene) but advantageous for adsorption of large molecules (e.g. toluene and xylene).

Therefore, loading of a mixture of ZSM-5 and USY on a monolithic carrier is a preferred method of using zeolite. Alternatively, ZSM-5 and USY may be loaded on a monolithic carrier separately in the flow direction of exhaust gas. In this case, ZSM-5 is preferably loaded on the upstream side of the carrier because ZSM-5 can adsorb and store HC up to a relatively high temperature of 150° C. β-Zeolite is preferred as well because it has bimodal pores of about 0.55 nm and about 0.70 nm and can adsorb both small molecules and large molecules relatively well.

While zeolite can be used as an adsorbent component as it is, it is preferred to allow zeolite to load thereon at least one noble metal selected from Pt, Pd and RH because the noble metal loaded on zeolite can suppress coking of HC appearing simultaneously with adsorption of HC by zeolite. Loading of nobel metal on zeolite allows for regeneration of zeolite without reduction in its adsorptivity for HC.

The noble metal loaded on zeolite is preferably Pd because Pd is most inexpensive and can regenerate zeolite most efficiently. The loading of noble metal is preferably conducted by an ion exchange method in view of the thermal stability. The amount of the noble metal loaded is preferably 5–40 g per $ft^3$ of monolithic carrier, in view of the cost and the efficiency of zeolite regeneration. When zeolite is loaded on a monolithic carrier, zeolite may contain, as necessary, 5–20% by weight of an inorganic binder (e.g. $Al_2O_3$ or $SiO_2$), whereby zeolite can be loaded on the monolithic carrier strongly without impairing the adsorptivity for HC.

The amount of the adsorbent component loaded per the unit volume of the monolithic carrier is preferably 0.05 to 2.0 g/cc. When the amount of the adsorbent component loaded is less than 0.05 g/cc, no sufficient HC adsorptivity is obtained. When the amount is more than 2.0 g/cc, the warm-up of the catalyst provided downstream of the adsorbent is slow.

The adsorbent used in the present system for exhaust gas purification may further comprise, in addition to the monolithic carrier and the adsorbent component (composed mainly of a zeolite) loaded on the carrier, a catalyst component loaded on the carrier, comprising a heat-resistant inorganic oxide and at least one noble metal selected from Pt, Pd and Rh, loaded thereon. (Hereinafter, such an adsorbent comprising even a catalyst component is referred to as "adsorbent-catalyst").

By thus allowing the adsorbent to comprise not only an adsorbent component but also a catalyst component, the HC desorbed from the adsorbent component can be purified not only by the downstream catalyst but also by the catalyst component of the adsorbent. The catalyst component preferably contains Pd, in particular, for the excellent low-temperature light-off property. In this case, the amount of Pd loaded per the unit volume of the monolithic carrier is preferably 50 to 250 g/ft$^3$ ($1.76 \times 10^{-3}$ to $8.83 \times 10^{-3}$ g/cc). When the amount of Pd loaded is less than 50 g/ft$^3$, there are problems in light-off property and durability. An amount of more than 250 g/ft$^3$ is not preferred for the cost.

As mentioned above, also when a noble metal is directly loaded on the zeolite of the adsorbent component by ion exchange or the like, the noble metal exhibits catalysis. In this case, however, the nobel metal in the zeolite tends to cause cohesion and has insufficient catalyst durability. Therefore, when it is intended to allow the adsorbent to have catalysis, it is preferred that as in the above adsorbent-catalyst, a catalyst component comprising a heat-resistant inorganic oxide and a noble metal loaded thereon is loaded on the monolithic carrier.

Figure 12A:
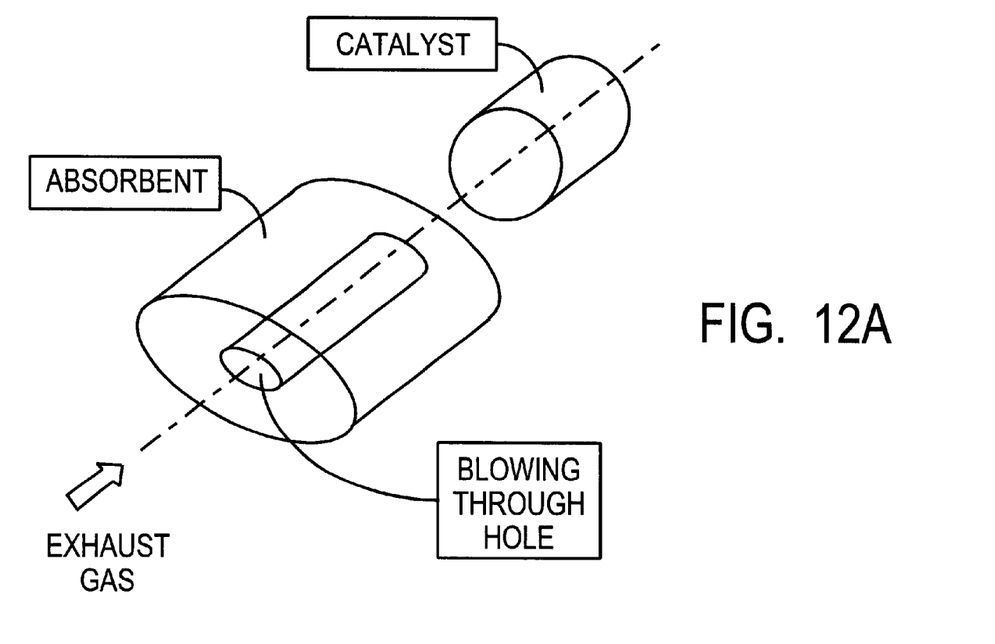
FIGS. 12A and B are two embodiments of a blowing through hole in the adsorbent located upstream of the catalyst.
Figure 12B:
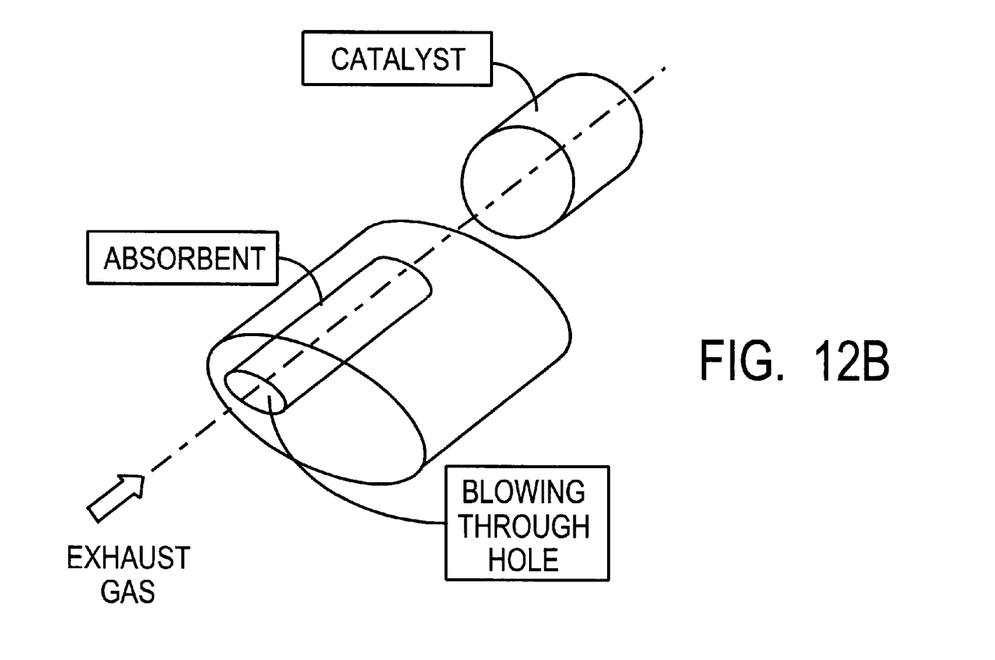

In the adsorbent, a blowing-through hole may be formed which has a diameter larger than that of each passage (cell) of the monolithic carrier as illustrated in FIG. 12A and B. By allowing part of the exhaust gas to pass through the blowing-through hole, the warm-up of the catalyst provided downstream of the adsorbent is promoted and the purification efficiency of desorbed HC is improved.

The diameter of the blowing-through hole is preferably 50 mm or less in view of the strength of carrier; the diameter is more preferably 40 mm or less in order to prevent the reduction in amount of HC adsorption, caused by blowing-through of excessive amount of exhaust gas. Conversely, when the diameter of the blowing-through hole is too small, the warm-up of the catalyst provided downstream of the adsorbent is insufficient. Therefore, the diameter is preferably 10 mm or more. There is no particular restriction as to the position of the blowing-through hole, and the position need not be the sectional center of the adsorbent as illustrated in FIG. 12A since it can be off center as illustrated in FIG. 12B.

The catalyst used in the present system for exhaust gas purification comprises a monolithic carrier and a catalyst component loaded on the carrier, having a purifiability for the harmful substances present in the exhaust gas emitted from an internal combustion engine. In order to favorably remove the HC, CO, NOx, etc. emitted from an internal combustion engine, the catalyst component preferably comprises a heat-resistant inorganic oxide and at least one noble metal selected from Pt, Pd and Rh, loaded on the inorganic oxide.

As the heat-resistant inorganic oxide, there are preferably used $Al_2O_3$, $SiO_2$, $TiO_2$, $ZrO_2$, compound oxides thereof, etc. Use of, in particular, $Al_2O_3$ having a specific surface area of 100 m$^2$/g or more is preferred because the noble metal can be loaded thereon in a highly dispersed state and improvements in low-temperature light-off property and heat resistance are obtained. Addition, to the heat-resistant inorganic oxide, of 5 to 30% by weight of an oxide having an oxygen storage capacity (OSC), such as $CeO_2$, $La_2O_3$, $CeO_2$—$ZrO_2$ or the like is highly preferred because improvement in steady state activity is obtained.

The catalyst component preferably contains Pd, in particular, for the excellent low-temperature light-off property. In this case, the amount of Pd loaded per the unit volume of the monolithic carrier is preferably 50 to 250 g/ft$^3$ ($1.76 \times 10^{-3}$ to $8.83 \times 10^{-3}$ g/cc). When the amount of Pd loaded is less than 50 g/ft$^3$, there are problems in light-off property and durability. An amount of more than 250 g/ft$^3$ is not preferred for the cost.

There is no particular restriction as to the number of the catalyst provided downstream of the adsorbent. In the present system for exhaust gas purification, it is possible to provide, upstream of the adsorbent in the flow direction of exhaust gas, another adsorbent and/or another catalyst. Thereby, the amount of HC adsorbed by the whole system or the purifiability during steady state operation can be improved.

In conducting exhaust gas purification during the cold start of engine by using the present system for exhaust gas purification, when, for a certain period during the cold start, an oxidizing gas (e.g. secondary air) is introduced into the exhaust gas or the ratio of the amount of air for combustion and the amount of fuel is changed so as to increase the oxygen amount in exhaust gas, the combustion reaction on catalyst is promoted and the early light-off of catalyst is achieved. The above introduction of oxidizing gas or the above change of the ratio of the amount of air for combustion and the amount of fuel for increased oxygen supply is preferred because as the HC adsorbed on the adsorbent begins to be desorbed with the temperature rise of the adsorbent caused by the heat of exhaust gas, the HC concentration in exhaust gas increases and the oxygen required for purification (combustion) of HC becomes short.

The present invention is hereinafter described in more detail by way of Examples. However, the present invention is not restricted to these Examples.

Production of Slurries to be Coated (Slurry A)

A β-zeolite having a Si/Al molar ratio of 110 was mixed with an appropriate amount of water. Thereto were added an appropriate amount of acetic acid and an alumina sol having an $Al_2O_3$ solid content of 2.5%, and the resulting mixture was pulverized in a ball mill for 15 hours, to produce slurry A.

(Slurry B)

To a commercial γ-$Al_2O_3$ were added an aqueous palladium nitrate solution and an appropriate amount of acetic acid, and the resulting mixture was pulverized in a ball mill for 15 hours. The resulting slurry was dried at 100° C. for 15 hours, then pulverized, and fired at 550° C. for 3 hours to obtain a Pd-predoped $Al_2O_3$ powder. The Pd-predoped $Al_2O_3$ powder was mixed with an appropriate amount of water. Thereto were added an appropriate amount of acetic acid and an alumina sol having an alumina solid content of 2.5%. The resulting mixture was pulverized in a ball mill for 15 hours to produce slurry B.

(Slurry C)

To a commercial γ-$Al_2O_3$ were added cerium acetate and cerium oxide [an OSC (oxygen storage capacity) improver during steady state operation] in an amount of 30% by weight in terms of oxide. The resulting mixture was subjected to wet pulverization, dried, and fired at 550° C. for 3 hours to obtain an $Al_2O_3.CeO_2$ compound oxide. Into the compound oxide was impregnated Pt by the use of an aqueous $H_2PtCl_5$ solution; the resulting material was dried and fired at 500° C. to obtain a Pt-loaded $Al_2O_3.CeO_2$ powder. The Pt-loaded $Al_2O_3.CeO_2$ powder was mixed with an appropriate amount of water. Further, an appropriate amount of acetic acid and an alumina sol having an alumina solid content of 2.5% were added. The resulting mixture was pulverized in a ball mill for 15 hours to produce slurry C.
(Slurry D)

Slurry D was produced in the same manner as in slurry C except that the aqueous $H_2PtCl_5$ solution was replaced by an aqueous $Rh(NO_3)_3$ solution.

Production of Adsorbents and Adsorbent-Catalyst
(Adsorbent A)

In slurry A was dipped a monolithic carrier having an elliptical sectional shape (a cordierite honeycomb produced by NGK Insulators, Ltd.; sectional major axis=142 mm; sectional minor axis=95 mm; length=150 mm) to coat slurry A on the monolithic carrier so that the amount of β-zeolite loaded per the unit volume of the monolithic carrier became 0.2 g/cc. The coated monolithic carrier was dried and fired to form adsorbent A as shown in Table 1.
(Adsorbent B)

In slurry A was dipped a monolithic carrier having an elliptical sectional shape (a cordierite honeycomb produced by NGK Insulators, Ltd.; sectional major axis=158 mm; sectional minor axis=79 mm; length=150 mm) to coat slurry A on the monolithic carrier so that the amount of β-zeolite loaded per the unit volume of the monolithic carrier became 0.2 g/cc. The coated monolithic carrier was dried and fired to form adsorbent B as shown in Table 1.
(Adsorbent C)

In slurry A was dipped a monolithic carrier having an elliptical sectional shape (a cordierite honeycomb produced by NGK Insulators, Ltd.; sectional major axis=189 mm; sectional minor axis=47 mm; length=150 mm) to coat slurry A on the monolithic carrier so that the amount of β-zeolite loaded per the unit volume of the monolithic carrier became 0.2 g/cc. The coated monolithic carrier was dried and fired to form adsorbent C as shown in Table 1.
(Adsorbent D)

In slurry A was dipped a monolithic carrier having an elliptical sectional shape (a cordierite honeycomb produced by NGK Insulators, Ltd.; sectional major axis=207 mm; sectional minor axis=30 mm; length=150 mm) to coat slurry A on the monolithic carrier so that the amount of β-zeolite loaded per the unit volume of the monolithic carrier became 0.2 g/cc. The coated monolithic carrier was dried and fired to form adsorbent D as shown in Table 1.
(Adsorbent E)

A blowing-through hole having a diameter of 25 mm was formed in a monolithic carrier having an elliptical sectional shape (a cordierite honeycomb produced by NGK Insulators, Ltd.; sectional major axis=142 mm; sectional minor axis=95 mm; length=150 mm) in such a way that the lengthwise central axis of the hole and the lengthwise central axis of the monolithic carrier were the same. The resulting monolithic carrier was dipped in slurry A to coat slurry A on the monolithic carrier so that the amount of β-zeolite loaded per the unit volume of the monolithic carrier became 0.2 g/cc. The coated monolithic carrier was dried and fired to form adsorbent E as shown in Table 1.

(Adsorbent F)

In slurry A was dipped a monolithic carrier having a circular sectional shape (a cordierite honeycomb produced by NGK Insulators, Ltd.; sectional diameter=118 mm; length=150 mm) to coat slurry A on the monolithic carrier so that the amount of β-zeolite loaded per the unit volume of the monolithic carrier became 0.2 g/cc. The coated monolithic carrier was dried and fired to form adsorbent F as shown in Table 1.
(Adsorbent-catalyst A)

In slurry B was dipped adsorbent A to coat slurry B on adsorbent A so that the amount of Pd loaded per the unit volume of the monolithic carrier became 200 g/ft³. The coated monolithic carrier was dried and fired to form adsorbent-catalyst A as shown in Table 1.

TABLE 1

| | Sectional shape | Major axis/ minor axis | Blowing-through hole |
|---|---|---|---|
| Adsorbent A | Elliptical | 1.5 | No |
| Adsorbent B | Elliptical | 2 | No |
| Adsorbent C | Elliptical | 4 | No |
| Adsorbent D | Elliptical | 7 | No |
| Adsorbent E | Elliptical | 1.5 | Yes |
| Adsorbent F | Circular | 1 | No |
| Adsorbent-catalyst A | Elliptical | 1.5 | No |

Production of Catalysts
(Catalyst A)

In slurry B was dipped a monolithic carrier having a circular sectional shape (a cordierite honeycomb produced by NGK Insulators, Ltd.; sectional diameter=93 mm; length=150 mm) to coat slurry B on the monolithic carrier so that the amount of Pd loaded per the unit volume of the monolithic carrier became 200 g/ft³. The coated monolithic carrier was dried and fired to form catalyst A.
(Catalyst B)

In slurry C was dipped a monolithic carrier having a circular sectional shape (a cordierite honeycomb produced by NGK Insulators, Ltd.; sectional diameter=144 mm; length=110 mm) to coat slurry C on the monolithic carrier so that the amount of Pd-loaded $Al_2O_3.CeO_2$ powder loaded per the unit volume of the monolithic carrier became 0.15 g/cc. The coated monolithic carrier was dried and fired, after which it was dipped in slurry D to coat slurry D on the monolithic carrier so that the amount of Rh-loaded $Al_2O_3.CeO_2$ powder loaded per the unit volume of the monolithic carrier became 0.05 g/cc. The resulting monolithic carrier was fired at 500° C. to form catalyst B. In catalyst B, the amount of noble metals loaded per the unit volume of the monolithic carrier was 40 g/ft³ (Pt/Rh=5/1).
Constitution of Exhaust Gas Purification systems Using the above-obtained adsorbents, adsorbent-catalyst and catalysts, the following exhaust gas purification systems were constituted. In the following description of each system, the numerical symbol of each adsorbent, adsorbent-catalyst or catalyst used in FIGS. 1 to 8 was shown in a parenthesis, in order to clearly distinguish their symbols A to F from said numerical symbol.
(System A)

Figure 1:
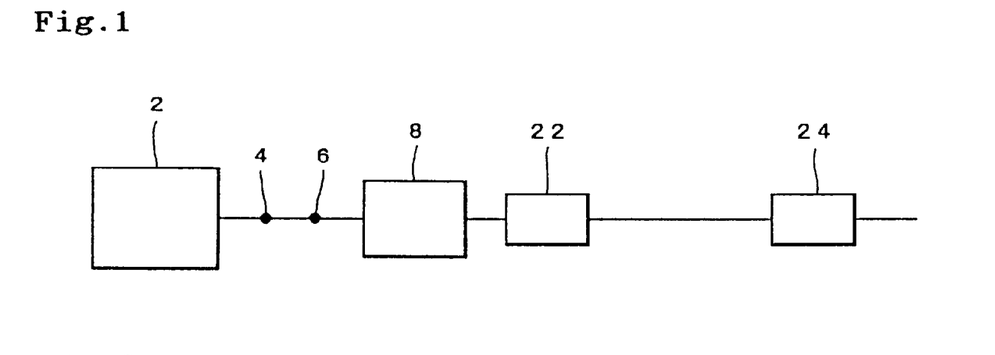
FIG. 1 is a schematic drawing showing the exhaust gas purification system used in Example 1.

As shown in FIG. 1, adsorbent A (8) and catalyst A (22) were provided in the exhaust gas line of engine (2) with adsorbent A (8) placed upstream in the flow direction of exhaust gas. Between engine (2) and adsorbent A (8) were provided $O_2$ sensor (4) for A/F adjustment and secondary air inlet (6) for promotion of light-off with $O_2$ sensor (4) placed upstream in the flow direction of exhaust gas. The distance from engine manifold outlet to adsorbent A (8) was 600 mm. Further, catalyst B (24) was provided at a position of 1,200 mm from engine manifold outlet.

(System B)

Figure 2:
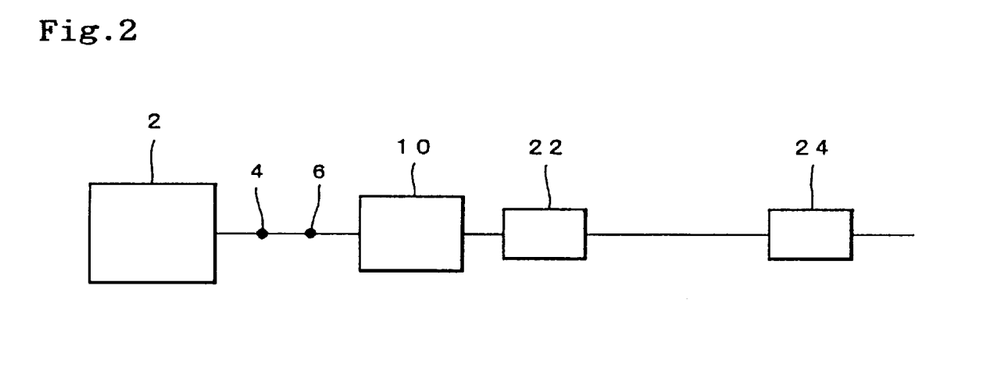
FIG. 2 is a schematic drawing showing the exhaust gas purification system used in Example 2.

As shown in FIG. 2, adsorbent B (10) and catalyst A (22) were provided in the exhaust gas line of engine (2) with adsorbent B (10) placed upstream in the flow direction of exhaust gas. Between engine (2) and adsorbent B (10) were provided $O_2$ sensor (4) for A/F adjustment and secondary air inlet (6) for promotion of light-off with $O_2$ sensor (4) placed upstream in the flow direction of exhaust gas. The distance from engine manifold outlet to adsorbent B (10) was 600 mm. Further, catalyst B (24) was provided at a position of 1,200 mm from engine manifold outlet.

(System C)

Figure 3:
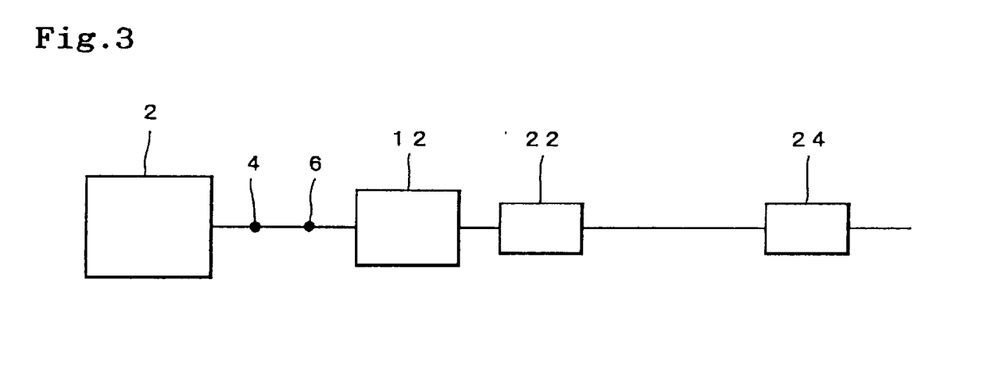
FIG. 3 is a schematic drawing showing the exhaust gas purification system used in Example 3.

As shown in FIG. 3, adsorbent C (12) and catalyst A (22) were provided in the exhaust gas line of engine (2) with adsorbent C (12) placed upstream in the flow direction of exhaust gas. Between engine (2) and adsorbent C (12) were provided $O_2$ sensor (4) for A/F adjustment and secondary air inlet (6) for promotion of light-off with $O_2$ sensor (4) placed upstream in the flow direction of exhaust gas. The distance from engine manifold outlet to adsorbent C (12) was 600 mm. Further, catalyst B (24) was provided at a position of 1,200 mm from engine manifold outlet.

(System D)

Figure 4:
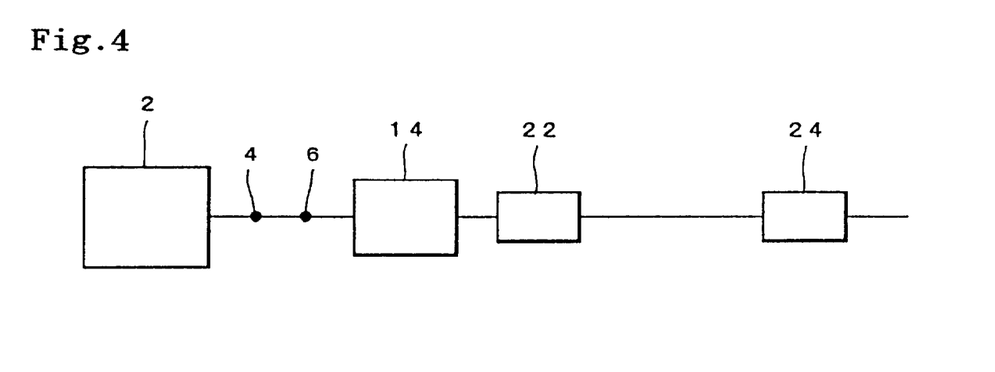
FIG. 4 is a schematic drawing showing the exhaust gas purification system used in Comparative Example 1.

As shown in FIG. 4, adsorbent D (14) and catalyst A (22) were provided in the exhaust gas line of engine (2) with adsorbent D (14) placed upstream in the flow direction of exhaust gas. Between engine (2) and adsorbent D (14) were provided $O_2$ sensor (4) for A/F adjustment and secondary air inlet (6) for promotion of light-off with $O_2$ sensor (4) placed upstream in the flow direction of exhaust gas. The distance from engine manifold outlet to adsorbent D (14) was 600 mm. Further, catalyst B (24) was provided at a position of 1,200 mm from engine manifold outlet.

(System E)

Figure 5:
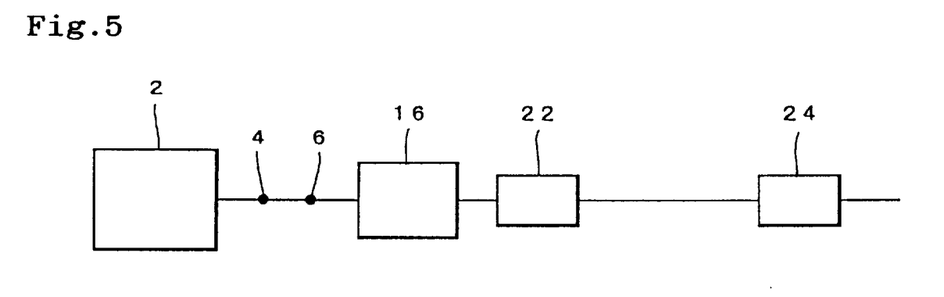
FIG. 5 is a schematic drawing showing the exhaust gas purification system used in Example 4.

As shown in FIG. 5, adsorbent E (16) and catalyst A (22) were provided in the exhaust gas line of engine (2) with adsorbent E (16) placed upstream in the flow direction of exhaust gas. Between engine (2) and adsorbent E (16) were provided $O_2$ sensor (4) for A/F adjustment and secondary air inlet (6) for promotion of light-off with $O_2$ sensor (4) placed upstream in the flow direction of exhaust gas. The distance from engine manifold outlet to adsorbent E (16) was 600 mm. Further, catalyst B (24) was provided at a position of 1,200 mm from engine manifold outlet.

(System F)

Figure 6:
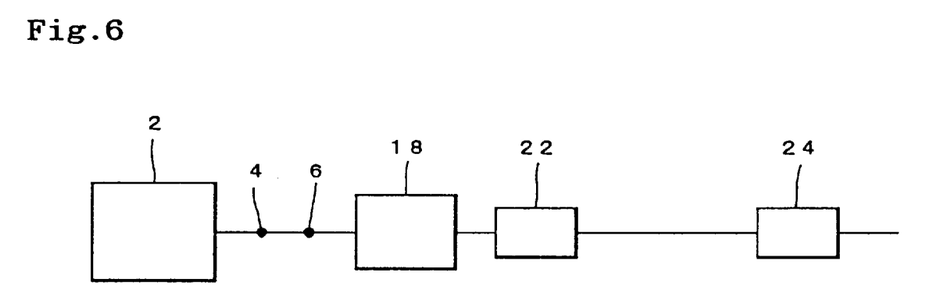
FIG. 6 is a schematic drawing showing the exhaust gas purification system used in Comparative Example 2.

As shown in FIG. 6, adsorbent F (18) and catalyst A (22) were provided in the exhaust gas line of engine (2) with adsorbent F (18) placed upstream in the flow direction of exhaust gas. Between engine (2) and adsorbent F (18) were provided $O_2$ sensor (4) for A/F adjustment and secondary air inlet (6) for promotion of light-off with $O_2$ sensor (4) placed upstream in the flow direction of exhaust gas. The distance from engine manifold outlet to adsorbent F (18) was 600 mm. Further, catalyst B (24) was provided at a position of 1,200 mm from engine manifold outlet.

(System G)

Figure 7:
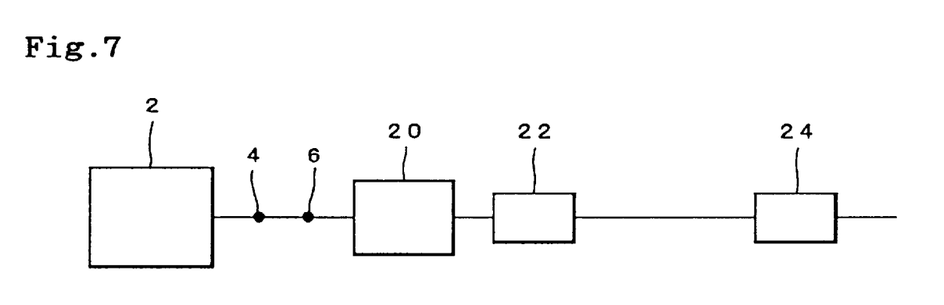
FIG. 7 is a schematic drawing showing the exhaust gas purification system used in Example 5.

As shown in FIG. 7, adsorbent-catalyst A (20) and catalyst A (22) were provided in the exhaust gas line of engine (2) with adsorbent-catalyst A (20) placed upstream in the flow direction of exhaust gas. Between engine (2) and adsorbent-catalyst A (20) were provided $O_2$ sensor (4) for A/F adjustment and secondary air inlet (6) for promotion of light-off with $O_2$ sensor (4) placed upstream in the flow direction of exhaust gas. The distance from engine manifold outlet to adsorbent-catalyst A (20) was 600 mm. Further, catalyst B (24) was provided at a position of 1,200 mm from engine manifold outlet.

(System H)

Figure 8:
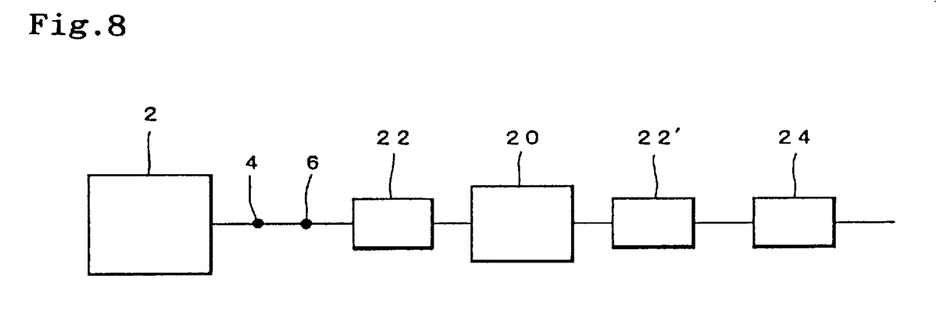
FIG. 8 is a schematic drawing showing the exhaust gas purification system used in Example 6.

As shown in FIG. 8, catalyst A (22), adsorbent-catalyst A (20) and catalyst A (22') were provided in this order in the exhaust gas line of engine (2) with catalyst A (22) placed most upstream in the flow direction of exhaust gas. Between engine (2) and catalyst A (22) were provided $O_2$ sensor (4) for A/F adjustment and secondary air inlet (6) for promotion of light-off with $O_2$ sensor (4) placed upstream in the flow direction of exhaust gas. The distance from engine manifold outlet to catalyst A (22) was 600 mm. Further, catalyst B (24) was provided at a position of 1,200 mm from engine manifold outlet.

Performance evaluation of exhaust gas purification systems

Each of the systems A to H was mounted on a test vehicle having a six-cylinder engine of 4,000 cc displacement and subjected to the FTP (LA-4 mode). In the FTP, in order to obtain an oxygen-rich exhaust gas, secondary air was introduced from the secondary air inlet of each system by the use of an air pump, at a rate of 100 Λ/min for 90 seconds from the engine cranking. The exhaust gas was collected by the CVS method and measured for HC emission. The results are shown in Table 2.

TABLE 2

| | System used | HG emission (g/mile) |
|---|---|---|
| Example 1 | A | 0.058 |
| Example 2 | B | 0.060 |
| Example 3 | C | 0.067 |
| Example 4 | E | 0.057 |
| Example 5 | G | 0.053 |
| Example 6 | H | 0.048 |
| Comparative Example 1 | D | 0.072 |
| Comparative Example 2 | F | 0.070 |

As shown in Table 2, in Examples 1 to 6 each using a system employing an adsorbent or adsorbent-catalyst having a sectional shape satisfying the following relation:

$$1.2 \leq \text{(major axis)/(minor axis)} \leq 6.5$$

lower emissions were obtained than in Comparative Example 1 using a system employing an adsorbent having a sectional shape of:

$$\text{(major axis)/(minor axis)} > 6.5$$

or in Comparative Example 2 using a system employing an adsorbent having a sectional shape of:

$$\text{(major axis)/(minor axis)} < 1.2$$

As described above, the exhaust gas purification system of the present invention uses an adsorbent having such a sectional shape that the temperature elevation rate of the adsorbent differs depending upon the position of its section and consequently the desorption of adsorbed HC from the adsorbent is made in a longer time. As a result, the HC adsorbed by the adsorbent during engine cold start and desorbed therefrom with the temperature increase of the adsorbent caused by exhaust gas heat can be removed by the catalyst also provided in the system, at a higher purification ratio. Further, the adsorbent can take various sectional shapes as long as the ratio of sectional major axis and sectional minor axis is in a given range, and is therefore have improved mountability on automobile.

What is claimed is:

1. A system for exhaust gas purification disposed in the exhaust gas pipe of an internal combustion engine, which consists of:
   an adsorbent comprising a monolithic carrier, and an adsorbent component having a hydrocarbon adsorptivity, loaded on the adsorbent carrier, and
   a downstream catalyst provided downstream of the adsorbent in the flow direction of the exhaust gas comprising a monolithic carrier and a catalyst component loaded on the catalyst carrier, having a purifiability for the harmful substances present in the exhaust gas emitted from the engine, in which system the adsorbent has a sectional shape with a longer major axis and a shorter minor axis satisfying the following relation:

$$1.2 \leq (\text{major axis})/(\text{minor axis}) \leq 6.5.$$

2. A system for exhaust gas purification according to claim 1, wherein the adsorbent has a sectional shape satisfying the following relation:

$$1.2 \leq (\text{major axis})/(\text{minor axis}) \leq 5.0.$$

3. A system for exhaust gas purification according to claim 1, wherein the adsorbent has an elliptical sectional shape.

4. A system for exhaust gas purification according to claim 1, wherein the adsorbent component is composed mainly of a zeolite.

5. A system for exhaust gas purification according to claim 4, wherein the zeolite has a Si/Al molar ratio of 40 or more.

6. A system for exhaust gas purification according to claim 4, wherein the zeolite is composed of at least one kind selected form ZSM-5, USY, β-zeolite and metallosilicate.

7. A system for exhaust gas purification according to claim 4, wherein the zeolite contains therein at least one noble metal selected from Pt, Pd and Rh.

8. A system for exhaust gas purification according to claim 1, wherein the adsorbent comprises, in addition to the monolithic carrier and the adsorbent component loaded on the adsorbent carrier, a catalyst component also loaded on the absorbent carrier, said catalyst component comprising a heat-resistant inorganic oxide and at least one noble metal selected from Pt, Pd and Rh, loaded on the heat-resistant inorganic oxide.

9. A system for exhaust gas purification according to claim 8, wherein the catalyst component of the absorbent comprises Pd and the amount of Pd loaded per the unit volume of the adsorbent monolithic carrier is 50 to 250 g/ft$^3$ ($1.76 \times 10^{-3}$ to $8.83 \times 10^{-3}$ g/cc).

10. A system for exhaust gas purification according to claim 1, wherein the amount of the adsorbent component loaded per the unit volume of the adsorbent monolithic carrier is 0.05 to 2.0 g/cc.

11. A system for exhaust gas purification according to claim 1, wherein the adsorbent has a blowing-through hole having a diameter larger than the diameter of each passage (cell) of the adsorbent monolithic carrier.

12. A system for exhaust gas purification according to claim 1, wherein the catalyst component comprises a heat-resistant inorganic oxide and at least one noble metal selected from Pt, Pd and Rh, loaded on the heat-resistant inorganic oxide.

13. A system for exhaust gas purification according to claim 12, wherein the catalyst component comprises Pd and the amount of Pd loaded per the unit volume of the catalyst monolithic carrier is 50 to 250 g/ft$^3$ ($1.76 \times 10^{-3}$ to $8.83 \times 10^{-3}$ g/cc).

14. A system for exhaust gas purification according to claim 1, wherein the adsorbent monolithic carrier contains no blowing-through hole.

15. A system for exhaust gas purification disposed in the exhaust gas pipe of an internal combustion engine, which consists of:
   an adsorbent comprising a monolithic carrier, and an adsorbent component having a hydrocarbon adsorptivity, loaded on the absorbent carrier,
   a downstream catalyst provided downstream of the adsorbent in the flow direction of the exhaust gas comprising a monolithic carrier and a catalyst component loaded on the catalyst carrier, having a purifiability for the harmful substances present in the exhaust gas emitted from the engine, in which system the adsorbent has a sectional shape with a longer major axis and a shorter minor axis satisfying the following relation:

$$1.2 \leq (\text{major axis})/(\text{minor axis}) \leq 6.5,$$

and
   another adsorbent and/or another catalyst downstream of the adsorbent in the flow direction of exhaust gas.

16. A system for exhaust gas purification disposed in the exhaust gas pipe of an internal combustion engine, which consists of:
   an adsorbent comprising a monolithic carrier, an adsorbent component having a hydrocarbon adsorptivity, loaded on the adsorbent carrier, and a catalyst component also loaded on the adsorbent carrier, said catalyst component comprising a heat-resistant inorganic oxide and at least one noble metal selected from Pt, Pd and Rh, loaded on the heat-resistant inorganic oxide,
   a downstream catalyst provided downstream of the adsorbent in the flow direction of the exhaust gas comprising a monolithic carrier and a catalyst component loaded on the catalyst carrier, having a purifiability for the harmful substances present in the exhaust gas emitted from the engine, and
   an additional upstream catalyst provided upstream of the adsorbent, in which system the adsorbent has a sectional shape with a longer major axis and a shorter minor axis satisfying the following relation:

$$1.2 \leq (\text{major axis})/(\text{minor axis}) \leq 6.5.$$

17. A system for exhaust gas purification according to claim 16, wherein the adsorbent monolithic carrier contains no blowing-through hole.

18. A system for exhaust gas purification disposed in the exhaust pipe of an internal combustion engine, consisting of:
   an adsorbent comprising a monolithic carrier and an adsorbent component having a hydrocarbon adsorptivity, loaded on the adsorbent carrier, and
   a catalyst comprising a monolithic carrier and a catalyst component loaded on the catalyst carrier, having a purifiability for the harmful substances present in the exhaust gas emitted from the engine, the catalyst being provided down-stream of the adsorbent in the flow direction of the exhaust gas, wherein the catalyst component consists of:
a heat resistant inorganic oxide with 5 to 30% by weight of an oxide having an oxygen storage capacity, wherein the heat resistant inorganic oxide is one of $A_2O_3$, $SiO_2$, $TiO_2$, $ZrO_2$, or a compound thereof, and the oxide having an oxygen storage capacity is one of $CeO_2$, $La_2O_3$ or $CeO_2$—$ZrO_2$; and
at least one noble metal selected from Pt, Pd or Rh,
in which system the adsorbent has a sectional shape satisfying the following relation:

$$1.2 \leq \text{(major axis)/(minor axis)} \leq 6.5.$$

19. A system for exhaust gas purification according to claim 18, wherein the adsorbent has a sectional shape satisfying the following relation:

$$1.2 \leq \text{(major axis)/(minor axis)} \leq 5.0.$$

20. A system for exhaust gas purification according to claim 18, wherein the adsorbent has an elliptical sectional shape.

21. A system for exhaust gas purification according to claim 18, wherein the adsorbent component is composed mainly of a zeolite.

22. A system for exhaust gas purification according to claim 21, wherein the zeolite has a Si/Al molar ratio of 40 or more.

23. A system for exhaust gas purification according to claim 21, wherein the zeolite is composed of at least one kind selected from ZSM-5, USY, Beta-zeolite or metallosilicate.

24. A system for exhaust gas purification according to claim 21, wherein the zeolite contains therein at least one noble metal selected from Pt, Pd or Rh.

25. A system for exhaust gas purification according to claim 18, wherein the adsorbent comprises, in addition to the monolithic carrier and the adsorbent component loaded on the adsorbent carrier, a catalyst component also loaded on the adsorbent carrier, comprising a heat-resistant inorganic oxide and at least one noble metal selected from Pt, Pd or Rh, loaded on the heat-resistant inorganic oxide.

26. A system for exhaust gas purification according to claim 25, wherein the catalyst component of the adsorbent comprises Pd and the amount of Pd loaded per unit volume of the adsorbent monolithic carrier is 50 to 250 g/ft$^3$ (1.76×10$^{-3}$ to 8.83×10–3 g/cc).

27. A system for exhaust gas purification according to claim 18, wherein the amount of the adsorbent component loaded per unit volume of the adsorbent monolithic carrier is 0.05 to 2.0 g/cc.

28. A system for exhaust gas purification according to claim 18, wherein the adsorbent has a blowing-through hole having a diameter larger than the diameter of each passage (cell) of the adsorbent monolithic carrier.

29. A system for exhaust gas purification according to claim 18, wherein the noble metal of the catalyst component is Pd and the amount of Pd loaded per unit volume of the catalyst monolithic carrier is 50 to 250 g/ft$^3$ (1.76×10$^{-3}$ to 8.83×10$^{-3}$ g/cc).

30. A system for exhaust gas purification disposed in the exhaust pipe of an internal combustion engine, which consists of:
an adsorbent comprising a monolithic carrier and an adsorbent component having a hydrocarbon adsorptivity, loaded on the adsorbent carrier, and
a catalyst comprising a monolithic carrier and a catalyst component loaded on the catalyst carrier, having a purifiability for the harmful substances present in the exhaust gas emitted from the engine, the catalyst being provided down-stream of the adsorbent in the flow direction of the exhaust gas,
wherein the catalyst component consists of:
a heat resistant inorganic oxide with 5 to 30% by weight of an oxide having an oxygen storage capacity, wherein the heat resistant inorganic oxide is one of $Al_2O_3$, $SiO_2$, $TiO_2$, $ZrO_2$, or a compound thereof, and the oxide having an oxygen storage capacity is one of $CeO_2$, $La_2O_3$, or $CeO_2$—$ZrO_2$;
at least one noble metal selected from Pt, Pd or Rh,
in which system the adsorbent has a sectional shape satisfying the following relation:

$$1.2 \leq \text{(major axis)/(minor axis)} \leq 6.5,$$

and
another adsorbent and/or another catalyst downstream of the adsorbent in the flow direction of exhaust gas.

\* \* \* \* \*